United States Patent
Peseux

(10) Patent No.: US 7,245,440 B2
(45) Date of Patent: Jul. 17, 2007

(54) VARIABLE FOCAL LENS

(75) Inventor: Jérôme Peseux, Solaize (FR)

(73) Assignee: Varioptic S.A., Lyons (FR)

( * ) Notice: Subject to any disclaimer, the term of this patent is extended or adjusted under 35 U.S.C. 154(b) by 0 days.

(21) Appl. No.: 11/314,081

(22) Filed: Dec. 22, 2005

(65) Prior Publication Data
US 2006/0152814 A1    Jul. 13, 2006

(30) Foreign Application Priority Data
Dec. 20, 2004    (FR) ................... 04 53200

(51) Int. Cl.
*G02B 1/06*    (2006.01)
(52) U.S. Cl. ..................... 359/666; 359/665
(58) Field of Classification Search ............... 359/665, 359/666
See application file for complete search history.

(56) References Cited

U.S. PATENT DOCUMENTS

| | | | |
|---|---|---|---|
| 6,369,954 B1 | 4/2002 | Berge et al. | |
| 6,823,198 B2 | 11/2004 | Kobayashi | |
| 7,002,737 B1 * | 2/2006 | Akiyama et al. | ........... 359/368 |
| 2005/0002113 A1 | 1/2005 | Berge | |

FOREIGN PATENT DOCUMENTS

EP    1 166 157 B1    7/2003

* cited by examiner

*Primary Examiner*—David Spector
*Assistant Examiner*—William Choi
(74) *Attorney, Agent, or Firm*—Foley & Lardner LLP

(57) ABSTRACT

A variable focus lens comprises a chamber containing a conductive liquid (5) and an insulating liquid (4) of different refractive indices, the surface of contact between the two liquids forming a deformable refractive surface (6) whose periphery is caused to move along the walls of a housing under the effect of an electric voltage (V). The housing comprises an upper portion (16) inclined relative to a plane perpendicular to the optical axis (Δ) of the lens, a lower portion (34, 48, 52) more inclined than the upper portion and a zone of junction (B') between the upper and lower portions, playing the role of a stop for the deformable refractive interface.

13 Claims, 3 Drawing Sheets

VARIABLE FOCAL LENS

FIELD OF THE INVENTION

The present invention relates to variable focus lenses and more particularly lenses using the deformation of a drop or volume of liquid by electrowetting phenomena, and optical devices including such lenses.

DESCRIPTION OF THE PRIOR ART

Various embodiments of variable focus lenses are described in commonly assigned European Patent No. 1166157 (corresponding to published U.S. Patent Application No. 2005/0002113) and U.S. Pat. No. 6,369,954, the entire disclosure of each being hereby incorporated by reference. Present FIG. 1 represents a section of an exemplary embodiment of a conventional variable focus lens along a plane containing the optical axis $\Delta$ of the lens. A cell is defined by two insulating and transparent plates 1 and 2 and side walls (not shown). The plates and side walls define a hermetic chamber filled with an insulating liquid and an electrically conductive liquid that is immiscible with the insulating liquid, the liquids having different refractive indices, and at least approximately the same density. The lower plate 2 comprises an indentation or recess 3 which receives a drop of the insulating liquid 4. The rest of the cell is filled with the electrically conductive liquid 5. The conductive liquid is usually an aqueous liquid, and the insulating liquid is typically an oily liquid. The surface of contact (interface) between the insulating liquid 4 and the conductive liquid 5 forms a deformable refractive surface 6.

The recess 3 comprises a tapered surface 7 with an axis $\Delta$ centered on a base 8. An electrode 9, for example, consisting of a layer of gold, covers the tapered surface 7 and a portion of the base 8 and is itself covered by an insulating layer 10. Another electrode 12 is in contact with the conductive liquid 5. By electrowetting phenomena, it is possible to modify the curvature of the deformable refractive surface 6 as a function of the voltage V applied between the electrodes 9, 12. Therefore, under the effect of an electric voltage, the periphery of the deformable refractive surface 6 is caused to move along the walls of the housing, which are defined by the surfaces of the recess covered with the electrode. A light beam passing through the cell orthogonally to the plates 1 and 2 in the region of the drop 4 will be more or less focused depending on the voltage V applied.

FIG. 2 is a section of a detail of FIG. 1. The insulating layer 10 substantially follows the shape of the recess 3 and therefore comprises an inclined portion 16 and a flat annular portion 18. The topmost point of the inclined portion 16 is indicated by the reference A. The point corresponding to the transition between the inclined portion 16 and the annular portion 18 is indicated by the reference B, and the end point of the annular portion, 18 which is substantially even with the end of the electrode 9 at the base 8, is indicated by the reference C. The angle $\theta$ is, in the sectional plane, the angle between a plane perpendicular to the optical axis $\Delta$ and the inclined surface 7. The angle $\theta$ is, for example, on the order of 45°. Furthermore, the angle, in the sectional plane, between the insulating layer 10 and the tangent to the deformable refractive surface 6 at the insulating layer 10, is marked $\alpha$. A specified voltage V results in a specified angle $\alpha$, thus fixing the convergence of the lens. As an example, the angles $\alpha_1$ to $\alpha_4$ shown in FIG. 2 represent different angle $\alpha$ values for increasing values of the voltage V.

FIG. 3 represents the evolution of the convergence 1/f of the lens as a function of the applied voltage V. For a zero voltage V, the insulating liquid 4 substantially wets up to the top end of the insulating layer 10, that is to say, to the level of the point A in FIG. 2. The angle between the deformable refractive surface 6 and the insulating layer 10 then corresponds to the angle $\alpha_1$. Since the deformable refractive surface 6 has a concave shape, a negative convergence is obtained. When the voltage V increases from zero, the deformable refractive surface 6 remains immobile so long as the voltage V is less than a threshold voltage $V_1$. This corresponds to a horizontal portion of curve 20 in FIG. 3.

When the voltage V increases from the threshold $V_1$ to a value slightly lower than a threshold $V_2$, the periphery of the deformable refractive surface 6 moves over the inclined portion 16 from the point A to the point B. This takes the form of an increase in the convergence of the lens, corresponding to the ascending portion of curve 22 in FIG. 3 and at the same time to an increase in the angle $\alpha$. As an example, in FIG. 2, the angle $\alpha_2$ corresponds to an intermediate position of the periphery of the deformable refractive surface 6 between the points A and B.

The point B corresponds to an unstable position of the deformable refractive surface 6. Specifically, when the voltage V is equal to $V_2$, the periphery of the deformable refractive surface 6 is at the point B, and the angle $\alpha$, then defined by the angle between the annular portion 18 and the tangent to the deformable refractive surface at the annular portion 18, falls sharply relative to the value that it had shortly before the point B. In FIG. 2, the angles $\alpha_3$ and $\alpha_4$ correspond respectively to positions of the periphery of the deformable refractive surface 6 on either side of the point B, revealing the sharp variation of the angle $\alpha$ on passing the point B. When the periphery of the deformable refractive surface 6 is at the point B, with the angle $\alpha$ diminishing sharply, the applied voltage V is then clearly greater than the voltage needed to impose such an angle $\alpha$. The periphery of the deformable refractive surface 6 then moves almost instantaneously from the point B to the point C. This is reflected, in FIG. 3, by an almost instantaneous increase in the convergence corresponding to a substantially vertical portion of curve 24, with the voltage substantially retaining the value $V_2$. Once the periphery of the deformable refractive surface 6 has reached the point C, an additional increase in the voltage no longer causes any movement of the deformable refractive surface 6, and therefore no further variation in the convergence results. This corresponds to the substantially horizontal portion of curve 26.

This instability that occurs when the deformable refractive surface 6 passes the point B is undesirable, since it means that it is impossible to precisely control the convergence of the lens for all the voltage values V that can be applied between the electrodes of the lens.

When the periphery of the deformable refractive surface 6 has passed the point B and is at the point C, and a user reduces the voltage V, the deformable refractive surface 6 remains immobile so long as the voltage is greater than a threshold voltage $V_3$, which is less than $V_2$ and generally greater than $V_1$, corresponding to the voltage sufficient to impose the angle $\alpha$ at the point C. The convergence then remains substantially constant, which corresponds to the substantially horizontal portion of curve 28. An additional reduction in the voltage V from $V_3$ to a value slightly higher than a threshold $V_4$ causes a movement of the periphery of the deformable refractive surface 6 from the point C to the point B. This is reflected in a slight reduction in the convergence of the lens corresponding to the descending portion of curve 30. The point B then corresponds again to an unstable position of the deformable refractive surface 6. Specifically, when the voltage V is equal to $V_4$, the periphery of the deformable refractive surface 6 tends to pass the point B to reach the level of the inclined portion 16. On passing the point B, the angle α increases sharply. Since the applied voltage is clearly lower than the voltage needed to impose the angle α, the periphery of the deformable refractive surface 6 moves almost instantaneously onto the inclined portion 16, to stop in a position corresponding to the angle α associated with the voltage $V_4$. This is reflected by a sharp fall in the convergence, corresponding to the substantially vertical portion of curve 32. A reduction in the voltage from $V_4$ to $V_1$ returns the periphery of the deformable refractive surface 6 to the point A.

The variation of the convergence of the lens is therefore different depending on whether the voltage V is increased or reduced. The phenomenon of hysteresis accentuates the absence of precise control of the convergence of the lens.

Such disadvantages could be prevented if the electrode 9 covered only the tapered surface 7 of the recess 3 and did not extend over the base 8. However, the metal layer depositing methods usually used with such applications do not provide sufficient accuracy to ensure a precise stop of the electrode 9 at the junction between the inclined surface 7 and the base 8. One solution would then be to limit the extent of the electrode 9 so that it stops between the points A and B. However, for a given shape of recess 3, it is desirable to have the widest range of convergence possible, which requires the electrode 9 to extend at least to the point B. In practice, the electrode 9 therefore extends over a substantial portion of the base 8.

Such disadvantages could, furthermore, be prevented by limiting the range of variations of the voltage V to values lower than the threshold $V_2$. However, in practice, the lens manufacturer cannot usually mandate the voltages that are to be applied to the electrodes of the cell by the end user and can therefore not ensure that a voltage higher than the threshold $V_2$ will never be applied.

SUMMARY OF THE INVENTION

One object of the invention is therefore to provide a variable focus lens whose convergence varies continuously and/or regularly or proportionally as a function of the voltage applied between the electrodes of the lens.

Another object of the invention is to provide a variable focus lens for which the variation of the convergence as a function of the voltage applied between the electrodes of the lens is not influenced as significantly by, and preferable does not present any, hysteresis.

In accomplishing these objects and others, there has been provided in accordance with one aspect of the present invention a variable focus lens having an optical axis, comprising: a housing that defines a chamber for containing a conductive liquid and an insulating liquid, the two fluids having different refractive indices and contacting one another to form a surface of contact that comprises a deformable refractive surface having a periphery that is caused to move along the wall of the housing as a function of an applied electric voltage (V), wherein the housing comprises: an upper wall portion inclined at first angle relative to a plane perpendicular to the optical axis (Δ) of the lens; a lower wall portion inclined at a second angle relative to said plane, wherein the second angle is greater than the first angle; a junction zone (B') between the upper and lower wall portions, wherein the surface of the housing at the junction zone presents a variation in wall inclination relative to the plane perpendicular to the optical axis of the lens sufficient to substantially block movement of the deformable refractive surface at the junction zone upon an incremental increase in applied voltage.

In accordance with another aspect of the invention, there has been provided a variable focus lens having an optical axis, comprising: a housing that defines a chamber for containing a conductive liquid and an insulating liquid, the two fluids having different refractive indices and contacting one another to form a surface of contact that comprises a deformable refractive surface having a periphery that is caused to move along the wall of the housing as a function of an applied electric voltage (V), wherein the housing comprises: a light-exit wall oriented at least essentially perpendicular to the optical axis; a first side wall portion having a first orientation relative to a plane perpendicular to the optical axis (Δ) of the lens; a second side wall portion, adjacent to said light-exit wall, having a second orientation relative to said plane; a junction zone (B') between the first and second side wall portions, wherein the surface of the housing at the junction zone presents a variation in a wall characteristic, preferably a discontinuity, e.g., in wall inclination, sufficient to substantially block movement of the deformable refractive surface at said junction zone upon an incremental increase in applied voltage.

In accordance with another aspect of the present invention, there is provided optical device including a variable focal length lens as defined above, preferably a mobile phone.

These and other objects, features and advantages of the present invention will become apparent from the following detailed description of several preferred exemplary embodiments, when considered together with the accompanying figures of drawing.

DETAILED DESCRIPTION OF THE PREFERRED EMBODIMENTS

The invention a variable focus lens comprising a chamber containing a conductive liquid and an insulating liquid of different refractive indices, the surface of contact between the two liquids forming a deformable refractive surface whose periphery is caused to move along the walls of a housing under the effect of an electric voltage. The housing comprises an upper portion inclined relative to a plane perpendicular to the optical axis of the lens, a lower portion more inclined than the upper portion and a junction zone (B') between the upper and lower portions, wherein the surface of the housing at the junction zone presents a significant, preferably, sharp variation of its inclination relative to the plane perpendicular to the optical axis of the lens, in order to have the deformable refractive surface remained blocked at the junction zone.

According to one preferred embodiment of the invention, the upper portion is inclined with respect to an axis parallel to the optical axis.

According to another preferred embodiment of the invention, the lower portion has a generally cylindrical shape with respect to an axis parallel to the optical axis.

According to another preferred embodiment of the invention, the lower portion has a generally inclined shape, with an axis parallel to the optical axis whose inclination relative to the plane perpendicular to the optical axis is greater than the inclination of the upper portion relative to the plane perpendicular to the optical axis, at the junction between the upper portion and the lower portion.

According to one preferred embodiment of the invention, the zone of junction (B') has a continuously variable curvature.

According to still another preferred embodiment of the invention, the upper portion and the lower portion correspond to surface portions of an insulating layer covering a metallic layer forming an electrode, itself deposited on an insulating substrate.

According to another embodiment of the invention, the housing comprises an at least partially transparent bottom.

Figure 1:
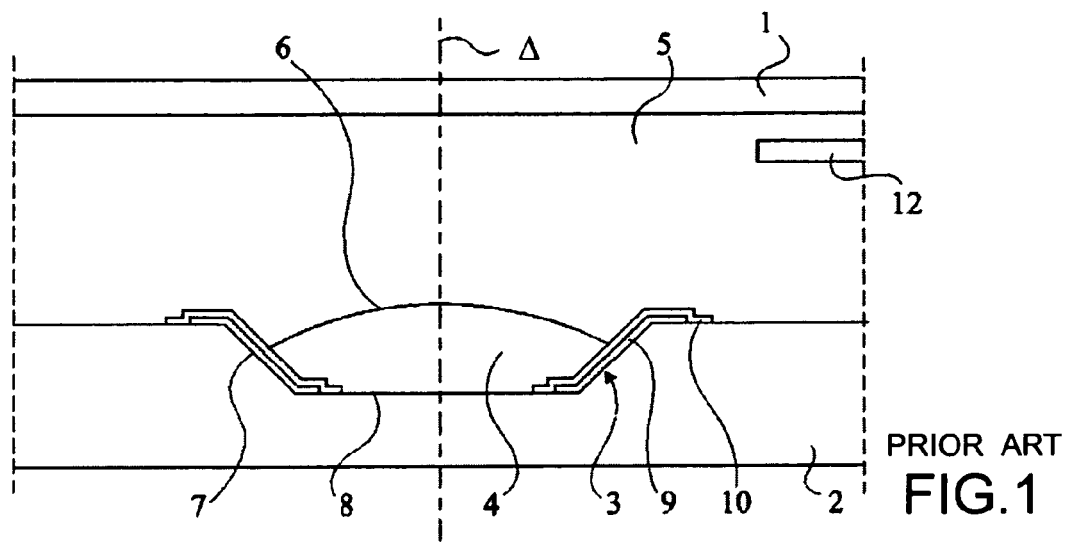
FIG. 1 is a cross-sectional view of a conventional exemplary embodiment of a variable focus lens.
Figure 2:
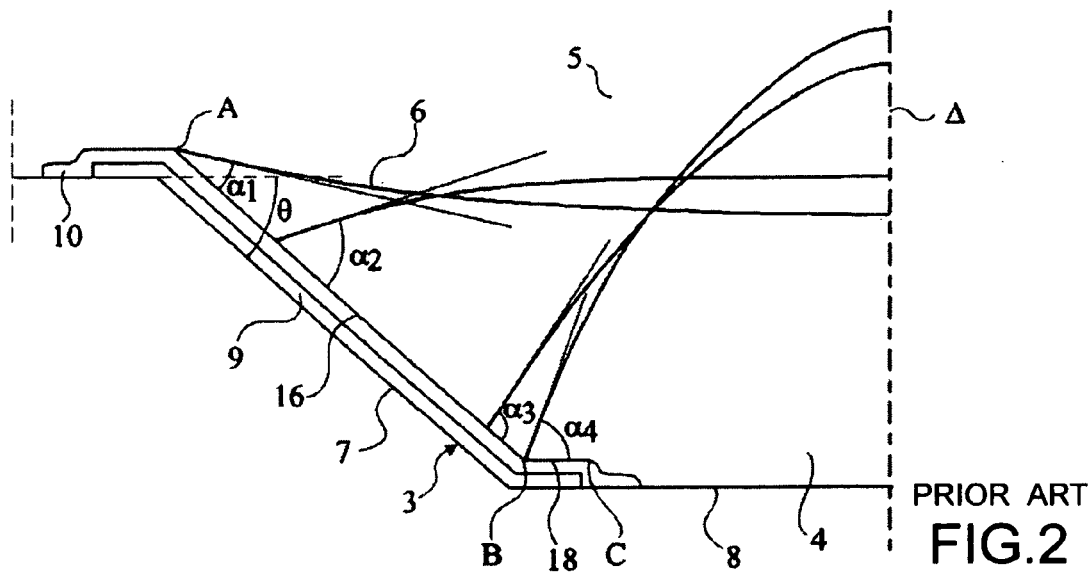
FIG. 2 is a cross-sectional view of a detail of the lens of FIG. 1.

Turning now to the drawings, the present invention involves providing, between the inclined surface 7 and the base 8 of the recess 3, an intermediate surface. At the junction between the inclined surface and the intermediate surface, in a plane containing the optical axis Δ of the lens, the angle between a plane perpendicular to the optical axis and the tangent to the intermediate surface is greater than the angle between a plane perpendicular to the optical axis and the inclined surface, or increases very rapidly relative to the angle between a plane perpendicular to the optical axis Δ and the inclined surface as one moves along the surface away from the junction. The electrode 9 then extends over the inclined surface 7, over the intermediate surface and, where necessary, over a portion of the base 8. The shape of the outer surface of the insulating layer 10 covering the electrode 9 follows and conforms to the shape of the recess 3. As a result, the housing wall, over the periphery of which the deformable refractive surface (6) is caused to move, includes an upper portion 16, the shape of which follows the shape of the surface 7, a lower portion 34 (FIG. 2), the shape of which follows the shape of the intermediate surface, and a junction zone between the upper and lower portions. According to the invention, the surface of the housing at the junction zone presents a marked, preferably sharp variation of its inclination relative to the plane perpendicular to the optical axis of the lens, sufficient to cause the deformable refractive surface to remained blocked at said junction zone. Thus, the angle α between the tangent to the deformable refractive surface 6 at the insulating layer 10 and the tangent to the insulating layer 10 increases markedly, and preferably sharply, when passing from the upper portion to the lower portion. Consequently, when the periphery of the deformable refractive surface, as it moves over the insulating layer at the inclined surface of the upper portion, reaches the junction zone between the inclined portion (16) and the lower portion, necessary a relatively significant or sharp increase in the voltage must be applied between the electrodes of the lens in order to cause the refractive surface pass the junction. Thus, for slight increases of voltage, the deformable refractive surface remains blocked at the junction zone which therefore plays the role of a stop. The phenomenon of instability is therefore no longer seen, as with the lens of FIG. 1, since the periphery of the deform able refractive surface 6 never reaches the junction zone between the intermediate surface and the bottom of the recess, where the instability phenomena occur. The intermediate surface may have anyone one of a large number of shapes and/or physical and/or chemical surface characteristics, since its change in characteristic(s), such as inclination relative to the optical axis, allows the operation described above.

Figure 4:
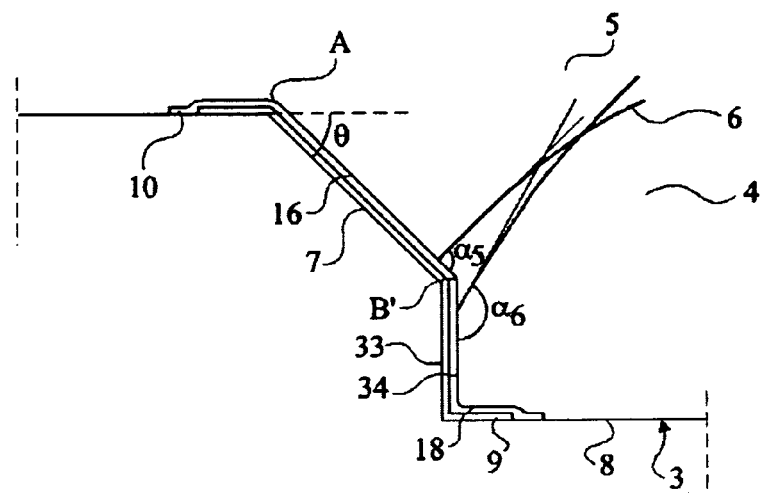
FIG. 4 is a cross-sectional view of a detail of a first exemplary embodiment of a variable focus lens according to the invention.

FIG. 4 is a detailed sectional view of a first exemplary embodiment of a variable focus lens according to the present invention. Between the inclined surface 7 and the base 8 of the recess 3, there is a cylindrical surface 33 whose axis corresponds to the optical axis Δ of the lens. The electrode 9 and the insulating layer 10 extend over the cylindrical surface 33 and over a portion of the base 8. The insulating layer 10 substantially follows the shape of the recess 3 and therefore includes a cylindrical portion 34 (lower portion) facing the cylindrical surface 33. The point corresponding to the transition between the inclined portion 16 and the cylindrical portion 34 of the insulating layer 10 is indicated by the reference B'. The angles $\alpha_5$ and $\alpha_6$ correspond, respectively, to positions of the periphery of the deformable refractive surface 6 on either side of the point B', revealing the significant variation in the angle α on passing the point B'. It will be noted that the angle $\alpha_6$ is clearly higher than the angle $\alpha_5$. The voltage V to be applied to keep the deformable refractive surface 6 in the position corresponding to the angle $\alpha_6$ is therefore clearly greater than the voltage V necessary to keep the deformable refractive surface 6 in the position corresponding to the angle $\alpha_5$.

Figure 3:
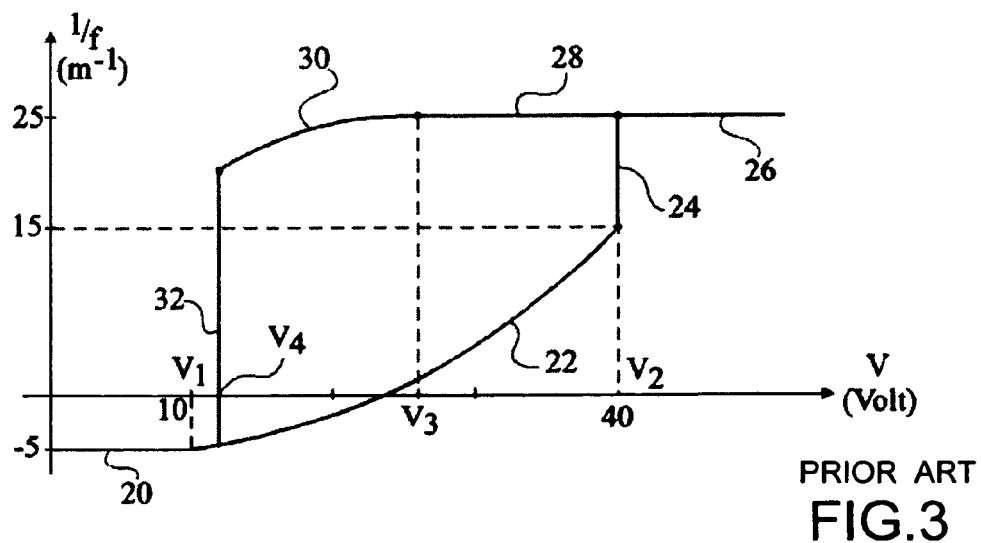
FIG. 3 illustrates, for the lens of FIG. 1, the variation of the convergence as a function of the voltage applied between the electrodes of the lens.
Figure 5:
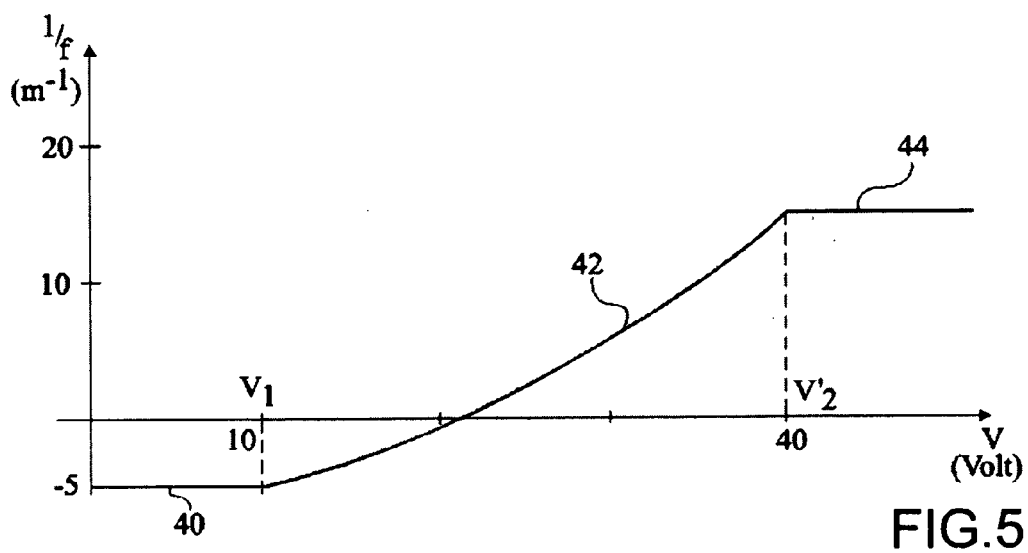
FIG. 5 illustrates, for the lens of FIG. 4, the variation of the convergence as a function of the voltage applied between the electrodes of the lens.

FIG. 5 represents the variation of the convergence of the lens of FIG. 4 as a function of the voltage V applied between the electrodes of the lens. In a manner similar to that described with respect to FIG. 3, for a zero voltage V, the insulating liquid 4 substantially wets to the top end of the insulating layer 10, that is to say, to the point A in FIG. 4. Since the deformable refractive surface 6 has a concave shape, a negative convergence is produced. As previously described, when the voltage V is increased from the value zero, the deformable refractive surface 6 remains immobile until the voltage V reaches the threshold $V_1$. This corresponds to the horizontal portion of curve 40 in FIG. 3.

When the voltage V increases from the threshold $V_1$ to a threshold $V'_2$, the periphery of the deformable refractive surface 6 moves over the inclined portion 16 of the insulating layer 10, from the point A to the point B'. This is reflected by an increase in the convergence of the lens, corresponding to the ascending portion of curve 42 in FIG. 5, corresponding at the same time to an increase in the angle α. For the deformable refractive surface 6 to be able to go beyond the point B', it would be necessary to apply a voltage V higher than a threshold (not shown in FIG. 5) that is clearly higher than $V'_2$. A slight increase in the voltage V beyond $V'_2$ therefore causes no movement of the deformable refractive surface 6 and therefore no increase in the convergence. This corresponds to the horizontal portion of curve 44.

Conversely, when the voltage V is reduced from a value higher than $V'_2$, for which the periphery of the deformable refractive surface 6 is at the point B', no movement of the deformable refractive surface 6 is observed until the voltage V reaches V'$_2$. When the voltage V reduces below V'$_2$, the deformable refractive surface 6 moves away from the point B' to come closer to the point A. Since the variation of the convergence follows the portion of curve 42, a hysteresis phenomenon is no longer observed.

Figures 6A, 6B:
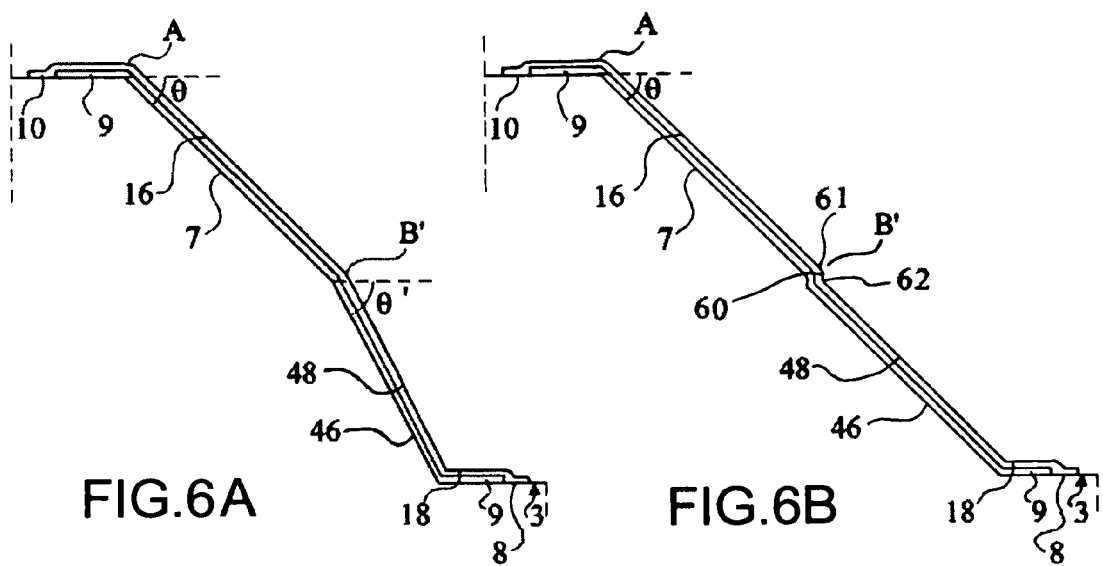
FIGS. 6A, 6B and 7 are cross-sectional views of details of further exemplary embodiments of a variable focus lens according to the invention.

FIG. 6A is a detailed sectional view of a second exemplary embodiment of a variable focus lens according to the invention. The intermediate surface is an inclined surface 46 for which, in the sectional plane, the angle θ' between a plane perpendicular to the optical axis Δ and the tapered surface 45 is greater than the angle θ. The insulating layer 10 comprises an inclined portion 48 facing the inclined surface 46. The point B' then indicates, in the sectional plane, the point corresponding to the junction between the inclined portion 16 and the inclined portion 48. What is then observed is a phenomenon similar to what has been previously explained with respect to FIG. 4, since the angle α between the tangent to the deformable refractive surface at the insulating layer 10 increases significantly and preferably sharply, when the periphery of the deformable refractive surface 6 passes the point B' on its way from the point A. This then gives a variation curve for the convergence that corresponds substantially to that shown in FIG. 5.

FIG. 6B is a section of a detail of a further embodiment of a variable focus lens according to the invention. According to this embodiment, the junction zone B' between the upper wall section 16 and the lower wall section 48 presents a variation in the wall characteristic, a type of inclination, sufficient to substantially block movement of the deformable refractive surface at the junction zone upon an incremental increase in applied voltage. The lower wall section 48 is adjacent to a base of the recess 3, oriented at least essentially perpendicular to the optical axis. According to this embodiment, the surface housing at the junction zone comprises a first zone portion 61 with a first variation in the wall inclination sufficient to substantially block movement of the deformable refractive surface. It further comprises a second zone portion 62 with an inverse variation in the wall inclination, the resultant inclination of the wall below the second zone portion being, for example, substantially identical to the inclination of the upper wall portion 16. In this particular embodiment, the intermediate surface between the first and second wall portions 61, 62 is preferentially made as short as possible, according to the process used for manufacturing the recess. For example, each of the first and second zone portions 61, 62 will present a curved surface whose radius is preferably less than about 0.1 mm, more preferably less than about 0.05 mm, and the intermediate surface 60 in this embodiment is preferably less than about 0.1 mm.

To have the junction zone play its role of a stop most efficiently or effectively, it is most preferred, in those embodiments which function based on a change in wall inclination, to have an increase of at least 20% of the inclination of the lower portion with regard to the inclination of the upper portion. For example in the exemplary embodiment of FIG. 7, for an inclination angle θ of the tapered surface of around 45°, the inclination angle of the intermediate surface should preferably increased to around 55°.

Further, it is preferred to have the junction zone made as short as possible when it is desired to have the stop be very sharp, as shown in FIG. 5. Because of the process of manufacturing the lens, the junction zone will necessary present a finite dimension, but this dimension should preferably be made as small as possible if it is desired to have the deformable refractive surface sharply stopped at the junction zone. For example, in the case of the recess being machined to obtain both the inclined surface 7 and the intermediate surface 33 (FIG. 4) or 46 (FIG. 7), the junction zone can preferably be shaped as a curved surface whose radius is preferably as small as possible. For example, a radius smaller than about 0,1 mm is preferred, and a radius less than about 0,05 mm will be especially preferred.

Figure 7:
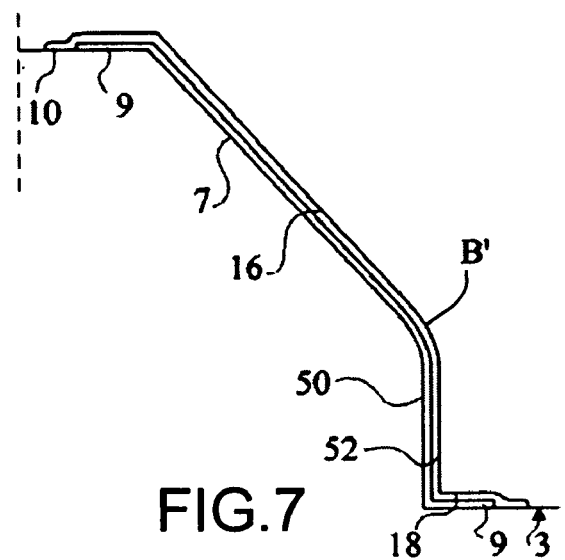

FIG. 7 is a detailed sectional view of a third exemplary embodiment of a lens according to the invention, in which the intermediate surface 50 is linked to the inclined surface 7 via a junction zone presenting a curved surface. The insulating layer 10 comprises a lower portion 52 facing the intermediate surface 50. The point B' then marks, in the sectional plane, the point corresponding to the junction between the inclined portion 16 and the lower portion 52. According to this embodiment, at the junction between the inclined portion 16 and the lower portion 52, the angle, in the sectional plane, between a plane perpendicular to the optical axis Δ and the tangent to the curved portion 52 increases rapidly relative to the angle θ, as one moves away from the point B'. The angle α between the insulating layer and the tangent to the deformable refractive surface at the insulating layer increases rapidly but continuously at the junction zone when the periphery of the deformable refractive surface passes the point B' on its way from the point A. Relative to the variation curve for the lens convergence of FIG. 5, the portion 42 extends without a sharp "break," via a rounded portion whose slope diminishes rapidly. This corresponds to an ever slighter movement of the deformable refractive surface when there is an increase in the voltage V.

Naturally, the present invention is capable of various variants and modifications which will appear to those skilled in the art based on the present description. In particular, the present invention has been described for a variable focus lens in which the periphery of the deformable refractive surface moves over an inclined surface. Naturally, the working surface over which the periphery of the deformable refractive surface travels may be different from an inclined surface. According to the invention an intermediate surface is included such that, at the junction between the working surface and the intermediate surface, the angle between a plane perpendicular to the optical axis and the tangent to the intermediate surface is greater than the angle between a plane perpendicular to the optical axis and the tangent to the working surface, or increases rapidly relative to the angle between a plane perpendicular to the optical axis and the tangent to the working surface, as one moves away from the working surface.

A further advantage of the lens according to the invention is described below. In some applications, it might be useful to limit the dynamics of the lens, i.e., the range of variation of the angle α as defined above (angle between the insulating layer 10 and the tangent to the deformable refractive surface 6 at the insulating layer 10 measured in the sectional plane). For example, in some designs of a variable focus lens, the dimension along the axis Δ needs to be limited. In this case, the lens will be designed so that the upper plate 1 (FIG. 1) and the lower plate 2 are closer to each other. Therefore, there is a risk that the drop of insulating liquid 4 can contact the plate 1. In this case, it can be advantageous to have the junction zone as described above play its role of a stop and therefore limit the range of variation of the angle α, while keeping for the substrate 2 a sufficient depth and thus maintaining its mechanical strength.

Figure 8:
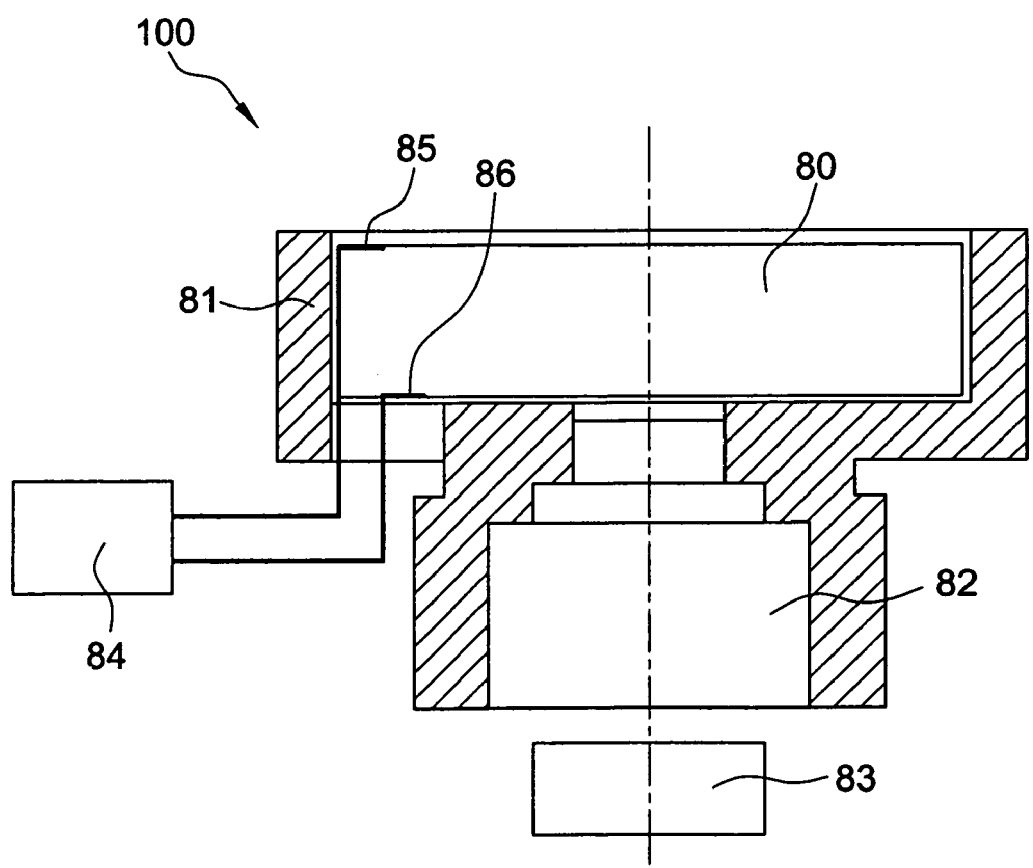
FIG. 8 is a schematic view of an optical device, such as a camera module for a mobile phone, including a variable focus lens according to the invention.

The variable focus lens according to the invention can be used in many applications, including, but not limited to, all devices including a miniature optical camera. FIG. 8 is a schematic representation of an optical device 100 incorporating a lens 80 of variable focal length according to the invention. The optical device comprises a mount 81 to hold the variable focus length lens and a set 82 of one or more fixed lenses. It further comprises an optical sensor 83 and a driver 84 for driving the variable lens, with the driver being connected to the electrodes of the lens through the connections 85, 86. A typical optical device is a camera module to be included in a mobile telephone, e.g., of the type generally described in U.S. Pat. No. 6,823,198, the entire disclosure of which is hereby incorporated by reference.

What is claimed is:

1. A variable focus lens having an optical axis, comprising: a housing that defines a chamber for containing a conductive liquid and an insulating liquid, the two fluids having different refractive indices and contacting one another to form a surface of contact that comprises a deformable refractive surface having a periphery that is caused to move along the wall of the housing as a function of an applied electric voltage (V), wherein the housing comprises:
    an upper wall portion inclined at first angle relative to a plane perpendicular to the optical axis ($\Delta$) of the lens;
    a lower wall portion inclined at a second angle relative to said plane, wherein the second angle is greater than the first angle;
    a junction zone (B') between the upper and lower wall portions, wherein the surface of the housing at the junction zone presents a variation in wall inclination relative to the plane perpendicular to the optical axis of the lens sufficient to substantially block movement of the deformable refractive surface at said junction zone upon an incremental increase in applied voltage.

2. A lens according to claim 1, wherein the upper portion is inclined with respect an axis parallel to the optical axis ($\Delta$).

3. A lens according to claim 1, wherein the lower portion has a generally cylindrical shape with an axis at least approximately parallel to the optical axis ($\Delta$).

4. A lens according to claim 1, wherein the lower portion has a generally inclined shape with respect to an axis parallel to the optical axis ($\Delta$), and wherein the angle of inclination of the lower portion relative to the plane perpendicular to the optical axis ($\Delta$) is greater than the angle of inclination of the upper portion relative to the plane perpendicular to the optical axis, at the junction between the upper portion and the lower portion.

5. A lens according to claim 1, wherein the junction zone (B') has a continuously variable curvature.

6. A lens according to claim 1, wherein the junction zone has a curved surface.

7. A lens according to claim 6, wherein the radius of said curved surface is less than about 0.1 mm.

8. A lens according to claim 7, wherein said radius is less than about 0.05 mm.

9. A lens according to claim 6, wherein the housing comprises a bottom at least approximately perpendicular to the optical axis ($\Delta$) and extending from said lower portion, the bottom of the housing comprising, at its periphery, a surface portion of the insulating layer covering the metallic layer.

10. A lens according to claim 1, wherein the upper portion and the lower portion correspond to surface portions of an insulating layer covering a metallic layer forming an electrode, itself deposited on an insulating substrate.

11. An optical device including a variable focal length lens according to claim 1.

12. A mobile phone including an optical device according to claim 11.

13. A variable focus lens having an optical axis, comprising: a housing that defines a chamber for containing a conductive liquid and an insulating liquid, the two fluids having different refractive indices and contacting one another to form a surface of contact that comprises a deformable refractive surface having a periphery that is caused to move along the wall of the housing as a function of an applied electric voltage (V), wherein the housing comprises:
    a light-exit wall oriented at least essentially perpendicular to the optical axis;
    a first side wall portion having a first orientation relative to a plane perpendicular to the optical axis ($\Delta$) of the lens;
    a second side wall portion, adjacent to said light-exit wall, having a second orientation relative to said plane;
    a junction zone (B') between the first and second side wall portions, wherein the surface of the housing at the junction zone presents a variation in a wall characteristic sufficient to substantially block movement of the deformable refractive surface at said junction zone upon an incremental increase in applied voltage.

* * * * *